(12) United States Patent
Behmlander et al.

(10) Patent No.: US 10,576,569 B2
(45) Date of Patent: Mar. 3, 2020

(54) CLIP FOR RETAINING COMPONENTS FOR WELDING

(71) Applicant: Caterpillar Inc., Deerfield, IL (US)

(72) Inventors: Matthew Behmlander, Metamora, IL (US); Michael Noble, Peoria, IL (US); Chad Kerestes, Oglesby, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/971,024

(22) Filed: May 4, 2018

(65) Prior Publication Data

US 2019/0337077 A1    Nov. 7, 2019

(51) Int. Cl.
| | | |
|---|---|---|
| *B23K 9/00* | (2006.01) | |
| *B23K 37/00* | (2006.01) | |
| *B23K 9/035* | (2006.01) | |
| *B23K 37/04* | (2006.01) | |

(52) U.S. Cl.
CPC .......... *B23K 9/035* (2013.01); *B23K 37/0435* (2013.01)

(58) Field of Classification Search
CPC ................ B23K 37/0531; B23K 9/035; B23K 11/0935; B23K 2101/06
See application file for complete search history.

(56) References Cited

U.S. PATENT DOCUMENTS

| | | | |
|---|---|---|---|
| 3,913,821 A | | 10/1975 | Brandsma |
| 4,201,326 A | * | 5/1980 | Connell ................. B23K 9/035 219/160 |
| 7,556,188 B2 | | 7/2009 | Kitamura |
| 9,808,876 B2 | | 11/2017 | Xia |
| 2014/0091128 A1 | * | 4/2014 | Vanderpol ............ B23K 9/0286 228/44.5 |

FOREIGN PATENT DOCUMENTS

| | | |
|---|---|---|
| EP | 1864744 A1 | 12/2007 |
| JP | 11267830 A | 10/1999 |

\* cited by examiner

*Primary Examiner* — Erin B Saad
(74) *Attorney, Agent, or Firm* — Bookoff McAndrews

(57) ABSTRACT

A retention clip used to retain workpieces during welding includes a spacer that extends along an axis and a plurality of first and second spring members positioned on opposite sides of the axis. The first spring members may be spaced apart from each other along the axis and configured to constrain a portion of a first workpiece between the first spring members and the spacer. And, the second spring members may be spaced apart from each other along the axis and configured to constrain a portion of a second workpiece between the second spring members and the spacer.

20 Claims, 5 Drawing Sheets

CLIP FOR RETAINING COMPONENTS FOR WELDING

TECHNICAL FIELD

The present disclosure relates generally to a retention clip, and more particularly, to a retention clip that may be used to hold structural components in place for welding.

BACKGROUND

Groove welding refers to welding structural members by depositing weld material in a groove between the members. Groove welds are used to join structural members in a wide variety of applications. During groove welding, beveled edges of two structural members are joined together to form a groove, and a weld is formed in the groove. During welding of such members, after the members are aligned and positioned in the required manner, tack welds are used to hold the members together until final welding is completed. However, the tack welds may prevent the molten weld material from completely filling the groove and thereby affect the quality and strength of the welded joint.

U.S. Pat. No. 9,808,876 (the '876 patent) issued to Xia on Nov. 7, 2017, discloses a method of welding two components together. In the '876 patent, a copper attachment or sticker is used to hold the components in place prior to welding. While the method of the '876 patent may be suitable for some applications, it may not be suitable for other applications. The present disclosure is directed at addressing one or more of the deficiencies and disadvantages set forth above and/or other problems in the art.

SUMMARY

In one aspect, a retention clip used to retain workpieces during welding is disclosed. The clip may include a spacer that extends along an axis, a plurality of first spring members, and a plurality of second spring members. The plurality of first spring members may be spaced apart from each other along the axis and positioned on one side of the spacer, and the plurality of second spring members may be spaced apart from each other along the axis and positioned on an opposite side of the spacer. The plurality of first spring members may be configured to constrain a portion of a first workpiece between the plurality of first spring members and the spacer, and the plurality of second spring members may be configured to constrain a portion of a second workpiece between the plurality of second spring members and the spacer.

In another aspect, a retention clip used to retain workpieces during welding. The clip may include a spacer that extends along an axis. A plurality of first spring members may be positioned on one side of the spacer. Each spring member of the plurality of first spring members may be shaped to constrain a portion of a first workpiece between the spring member and the spacer, and bias the first workpiece towards the spacer. The clip may also include a plurality of second spring members positioned symmetric to the plurality of first spring members on an opposite side of the spacer. Each spring member of the plurality of second spring members may be shaped to constrain a portion of a second workpiece between the spring member and the spacer, and bias the second workpiece towards the spacer.

In yet another aspect, a method of welding workpieces is disclosed. The method may include constraining a portion of a first workpiece between a plurality of first spring members and a spacer. Spring members of the plurality of first spring members may be (a) spaced apart from each other along an axis and (b) positioned on one side of the spacer. The method may also include constraining a portion of a second workpiece between a plurality of second spring members and the spacer. Spring members of the plurality of second spring members may be (c) spaced apart from each other along the axis and (d) positioned on an opposite side of the spacer. The method may also include dispensing weld material into a space formed between the constrained first and second work pieces.

DETAILED DESCRIPTION

Figure 1A:
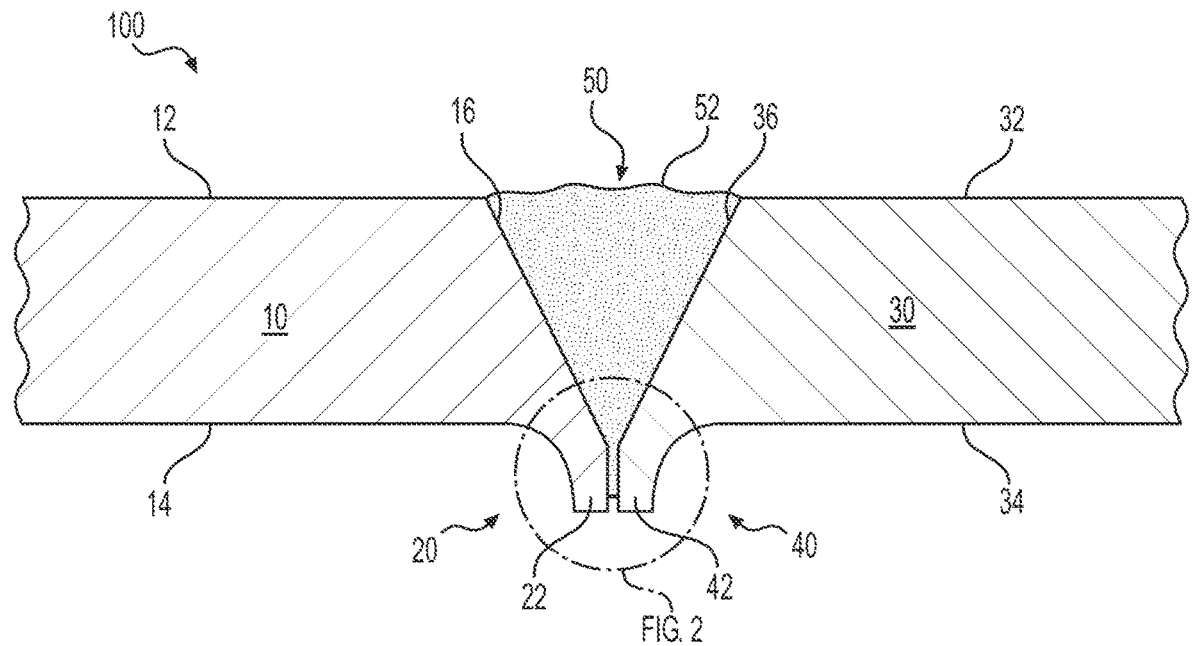
FIG. 1A is an illustration of an exemplary structure welded together using a groove weld.

In this disclosure, relative terms, such as, for example, "about" is used to indicate a possible variation of ±10% in a stated numeric value. Although the current disclosure is described with reference to groove welding components of a specific geometry, this is only exemplary. In general, the current disclosure can be applied to join together components having any suitable geometry. Reference will now be made in detail to specific embodiments or features, examples of which are illustrated in the accompanying drawings. Generally, corresponding or similar reference numbers will be used, when possible, throughout the drawings to refer to the same or corresponding parts. Features in the drawings may not be drawn to scale, but may rather be drawn to highlight different aspects of the disclosure.

FIG. 1A illustrates a cross-sectional view of an exemplary structure 100 formed by two workpieces or structural members, a first structural member 10 and a second structural member 30, joined by a weld 50. First and second structural members will hereinafter be referred to as first and second members 10, 30. As will be described in more detail later, first and second members 10, 30 may have any configuration (e.g., a planar, cylindrical, tubular, etc.). Without limitation, first and second members 10, 30 may include any material (same or different materials) that may be joined together by welding. In the embodiment shown in FIG. 1A, first and second members 10, 30 have a similar, equivalent, and opposing geometries. That is, first and second members 10, 30 are mirror symmetric about a vertical plane that extends between them. However, this geometry is only exemplary. In general, first and second members 10, 30 may have a symmetric or non-symmetric geometry. First member 10 includes a first surface 12 and an opposing second surface 14, and second member 30 includes a first surface 32 and an opposing second surface 34. In general, first surfaces 12, 32 and second surfaces 14, 34 may be any two opposing sides of structure 100. For example, in some exemplary embodiments where structure 100 has a tubular configuration, first surfaces 12, 32 may be the outer surface of the tubular structure and second surfaces 14, 34 may be the inner surface of the tubular structure. However, in some other embodiments, first surfaces 12, 32 may be the inner surface and second surfaces 14, 34 may be the outer surface of a tubular structure. In embodiments where first and second members 10, 30 have a planar or plate-like configuration, first surfaces 12, 32 may be the upper or lower surface of the plate and second surfaces 14, 34, the opposite surface.

Figure 1B:
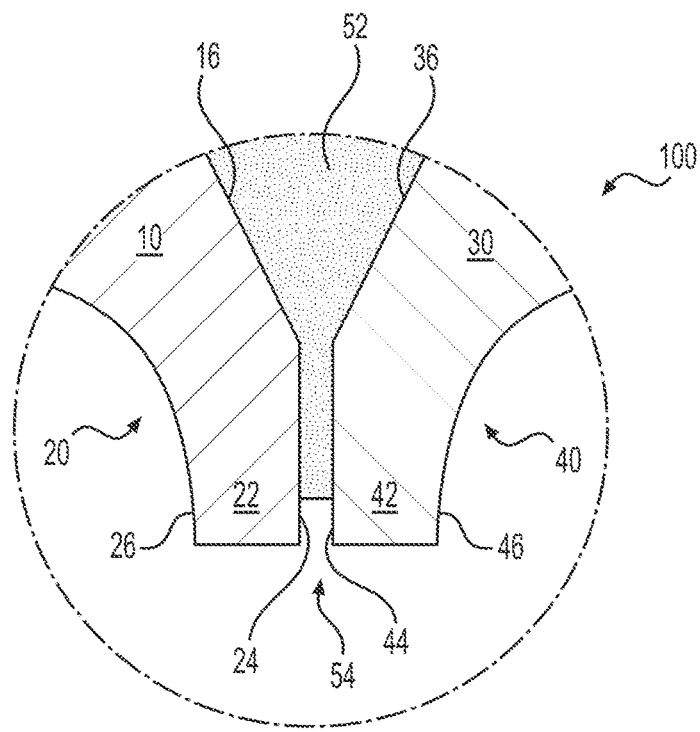
FIG. 1B is an enlarged view of a portion of the groove weld of FIG. 1A.

As illustrated in FIG. 1A, first member 10 and second member 30 include end portions 20, 40 in a region where the two members are joined together by weld 50. FIG. 1B is an enlarged view of the end portions 20, 40 of first and second members 10, 30. In the discussion below, reference will be made to both FIGS. 1A and 1B. End portion 20 includes a root protrusion 22 that projects from its second surface 14, and end portion 40 includes a root protrusion 42 that projects from its second surface 34. In embodiments where structure 100 is a tubular component and second surfaces 14, 34 form the inner surface of the tubular component, root protrusions 22, 42 may be flange-like projections that extend radially inward from the cylindrical inner surface of the tubular component. Similarly, in embodiments where second surfaces 14, 34 form the outer surface of the tubular component, root protrusions 22, 42 may extend radially outwards from the cylindrical outer surface of the tubular component.

At end portions 20 and 40, first and second members 10 and 30 may be beveled. For example, first member 10 may be beveled to form an end surface 16 that makes an angle (e.g., an obtuse angle) with respect to first surface 12. And, second member may beveled to form an end surface 36 that makes an angle with respect to the first surface 32. End surface 16 may form a continuous surface with an end surface 24 of root protrusion 22, and end surface 36 may form a continuous surface with an end surface 44 of root protrusion 42. End surfaces 16 and 24 define an edge of first member 10 that is joined to second member 30 via weld 50, and end surfaces 36 and 44 define an edge of second member 30 that is joined to first member 10 via weld 50. When first and second members 10, 30 are positioned such that end surfaces 24 and 44 abut (or are positioned proximate to each other), end surfaces 16 and 36 together define a groove. Weld 50, referred to as a groove weld, is formed by dispensing molten weld material 52 in the groove. In embodiments where end surfaces 24, 44 abut, the groove formed between first and second members 10, 30 (and weld 50) may have a V-shaped configuration. Forming a V-shaped groove is not a requirement and in general, the groove may have any shape. For example, in embodiments where end surfaces 16 and 36 are curved surfaces, a different shaped (e.g., U-shaped) groove may be formed between first and second members 10, 30.

In some embodiments, during welding, end surfaces 24, 44 may be positioned such that a gap 54 is formed between these surfaces. When molten weld material 52 is dispensed into the groove to form weld 50, the weld material 52 also flows into and fills (and at least partially) gap 54. In some such embodiments, the groove formed between first and second members 10, 30 (and the formed weld 50) may have a funnel-like cross sectional shape. Thus, as illustrated in FIG. 1B, weld 50 is formed between end surfaces 16 and 24 of first member 10 and end surfaces 36 and 44 of second member 30. As explained in U.S. patent application Ser. No. 15/377,026 (the '026 application) filed on Dec. 13, 2016, incorporated by reference in its entirety herein, incorporating root protrusions (such as root protrusions 22, 42) in welded members and forming a groove weld between the root protrusions (i.e., forming root protected groove welds) improves the fatigue life of the groove weld. It should be noted that the geometry of root protrusions 22, 42 and the groove illustrated in FIGS. 1A and 1B are only exemplary. The '026 application describes many exemplary embodiments of root protrusion and groove structures that may be used with embodiments of the current disclosure.

Irrespective of the shape of the welded parts (e.g., first and second members 10, 30) and the groove formed between them, typically when two parts are welded together, they are first tack welded (or spot welded) to hold them in place while they are being welded together. As is known to people skilled in the art, groove welding typically involves a series of welding passes where molten weld material 52 is deposited in an overlapping manner into the groove between first and second members 10, 30. The presence of tacks welds (or spot welds) in the groove may disrupt the flow of the molten weld material 52 in the groove and cause voids or inclusions in the resulting weld 50. In embodiments with gap 54, the tacks welds in the groove may block the flow of the molten weld material 52 into gap 54 and create voids in weld 50. To prevent or minimize the formation of such voids, in some embodiments, in place of (or in some embodiments, in addition to) tacks welds, a retention clip may be used to hold or retain first and second members 10, 30 in place during welding.

Figure 2A:
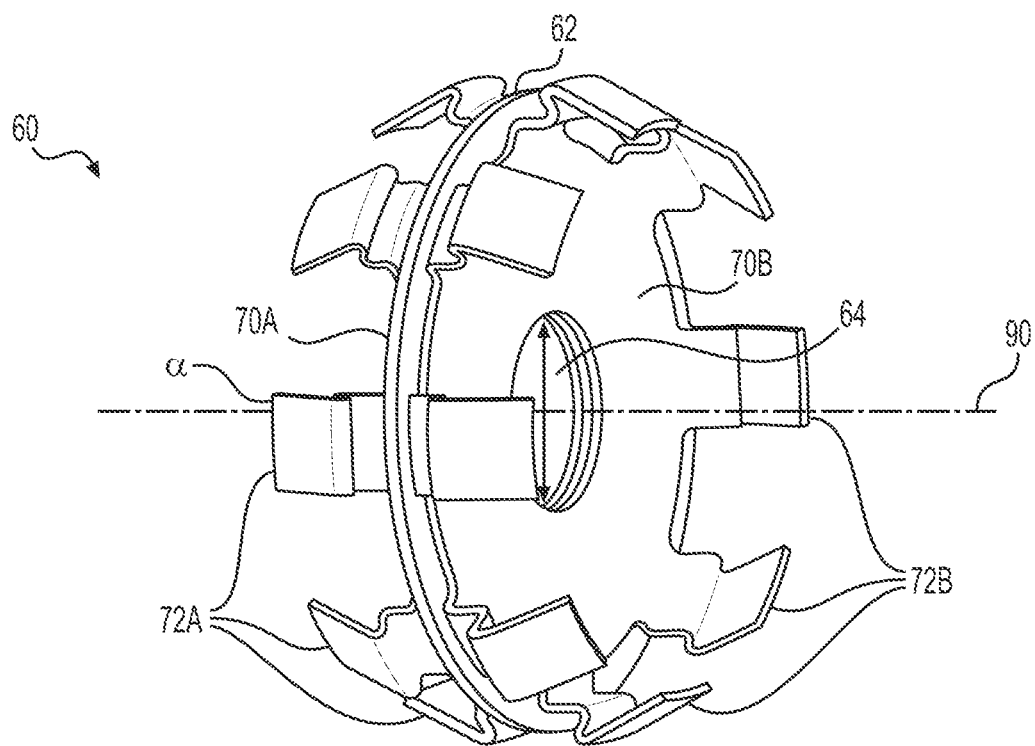
FIG. 2A is a perspective view of an exemplary clip that may be used to retain the structure of FIG. 1A while forming the groove weld.
Figure 2B:
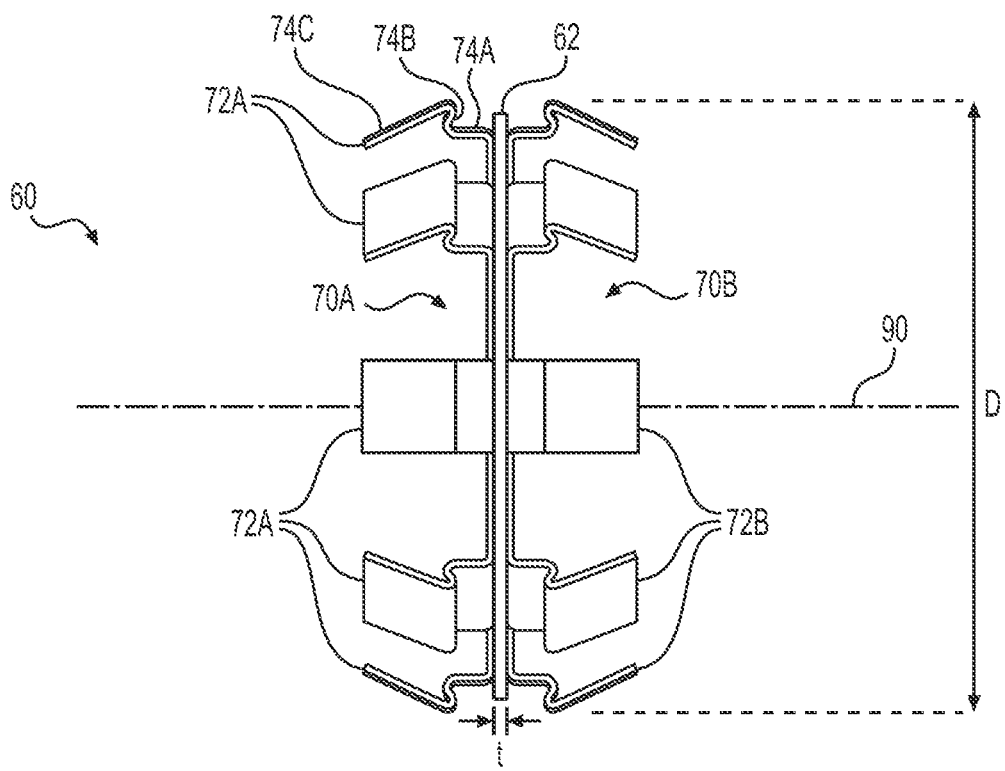
FIG. 2B is a side view of the exemplary clip of FIG. 2A.

FIGS. 2A and 2B illustrate an exemplary clip 60 that may be used to retain or hold first and second members 10, 30 in place during welding. FIG. 2A illustrates a perspective view of clip 60, and FIG. 2B illustrates a side view of clip 60. In the discussion below, reference will be made to both FIGS. 2A and 2B. It should be noted that the embodiment of clip 60 illustrated in FIGS. 2A and 2B is configured to retain first and second members 10, 30 having a tubular configuration. In the illustrated embodiment, clip 60 includes a substantially circular spacer 62 extending about a central axis 90 with multiple spring members 72A, 72B substantially symmetrically positioned about central axis 90, and extending towards opposite sides of spacer 62. In some embodiments, spacer 62 may include an opening or cavity 64. Although not a requirement, cavity 64 may have a substantially circular shape and may be substantially centrally located on spacer 62 (i.e., central axis 90 may pass through the center of spacer 62 and cavity 64). In some embodiments, as illustrated in FIG. 2A, spacer 62 may extend along a circular axis (that extends about central axis 90) to form an annular disk with an inner diameter d, outer diameter D, and thickness t. In general, inner diameter d, outer diameter D, and thickness t may have any value. Typically, these dimensions may depend on the application (e.g., size and shape of welded parts, configuration of desired weld, etc.). Spacer 62 may be formed of any material (e.g., steel) that may be used in welding applications.

In some embodiments, spring members 72A that extend towards one side (e.g., first side) of spacer 62 may be part of a first frame 70A attached to the first side of spacer 62. And, spring members 72B that extend towards the opposite side (e.g., second side) of spacer 62 may be part of a second frame 70B attached to the second side of spacer 62. In some embodiments, as illustrated in FIGS. 2A and 2B, first and second frames 70A, 70B (and their respective spring members 72A, 72B) may be substantially similar to each other in construction and configuration. In some embodiments, first and second frames 70A, 70B may be attached to spacer 62 such that the two frames 70A, 70B (and their respective spring members 72A, 72B) are mirror symmetric about a plane of spacer 62. In the description below, unless it is useful to separately identify these components, first and second frames 70A, 70B will be jointly referred to as frame 70, and spring members 72A and 72B will be jointly referred to as spring member 72.

In some embodiments, similar to spacer 62, frame 70 may also have an annular disk-like shape with a central cavity, an inner diameter, and an outer diameter. Frame 70 may be aligned to be concentric with respect to spacer 62 (i.e., central axis 90 passes through the center of spacer 62 and frame 70). Although not a requirement, the inner diameter of frame 70 may be similar to (or be substantially the same as) the inner diameter d of spacer 62. The outer diameter of frame 70 may be less than the outer diameter D of spacer 62, such that when frames 70 are attached to opposite sides of spacer 62, a ring-shaped band of spacer 62 extends outside the outer diameter of frame 70 (as best seen in FIG. 2B). Frame 70 may be made of any suitable material (e.g., steel, etc.). In some embodiments, frame 70 may be made of spring steel. And, spacer 62 may be made of a weldable steel.

Multiple spring members 72 may extend from the outer periphery of frame 70. As will be described in more detail below, these spring members 72 may be configured to act as a spring that presses against and retains first and second members 10, 30. In some embodiments, spring members 72 may extend generally transverse to frame 70 and away from spacer 62. For example, spring members 72A may extend generally transverse to frame 70A and away from spacer 62, and spring members 72B may extend generally transverse to frame 70B and away from spacer 62. In some embodiments, the spacing between adjacent spring members may be substantially the same. Although not a requirement, in some embodiments, spring members 72 may be arranged on frame 70 such that they are substantially symmetric about central axis 90. In some embodiments, the spring members 72 on either side of spacer 62 may be positioned symmetrically about spacer 62 (e.g., symmetric about a plane perpendicular to central axis 90 and passing through a center of spacer 62). However, symmetric positioning of spring members 72 about spacer 62 is not a requirement. In some embodiments, spring members 72 on either side of spacer 62 may not be symmetrically positioned about spacer 62. Clip 60 may include any number of spring members 72. Typically, the number, dimensions, spacing, etc. of spring members 72 may be selected based on the size of the first and second members 10, 30 that are intended to be retained by clip 60. Although not a limitation, in some embodiments, the number of spring members 72A, 72B on each frame 70A, 70B may be between about 3 and 16 (e.g., 4, 6, 8, 10, 12, 14, 16, etc.).

Each spring member 72 may include a length of material (or a strip or material extending from the outer periphery of springs member 70) bent to have a spring-like configuration suitable to press against and retain first and second members 10, 30 during welding. Each spring member 72 may have substantially the same shape and configuration. As illustrated in one of the spring members 72 of FIG. 2B (spring member 72A on the top left), each spring member 72 may include a first length 74A, a second length 74B, and a third length 74C. First, second, and third lengths 74A, 74B, 74C may be segments (or portions) of spring member 72 that are shaped in a manner such that spring member 72 has the desired spring-like configuration and properties (e.g., flexibility, stiffness, elastic range, etc.). First length 74A may have one end connected to (or formed integrally with) the outer periphery of frame 70 and an opposite end positioned away from frame 70 (along the direction of central axis 90). In some embodiments, at least a portion of first length 74A may extend substantially parallel to central axis 90. Second length 74B may be a curved segment of spring member 72 that extends from one end of first length 74A and is attached to third end 74C at its opposite end. In some embodiments, second length 74B may be a generally S-shaped or Z-shaped segment that is connected to one end of first length 74A, and third length 74C may be a generally linear segment connected at one end to the generally S-shaped second end 74B and is inclined towards central axis 90.

Figure 3A:
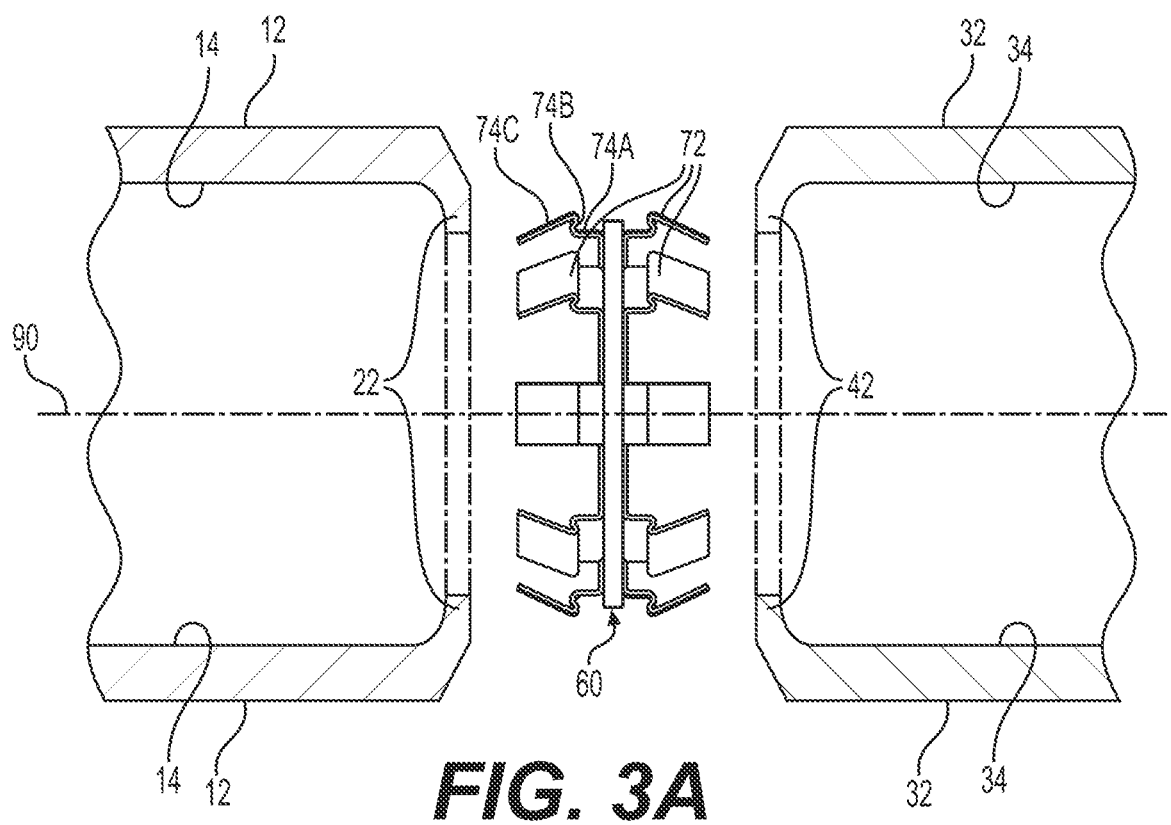
FIG. 3A is a side view showing the components that form the structure of FIG. 1 and the clip of FIG. 2A aligned for attachment.
Figure 3B:
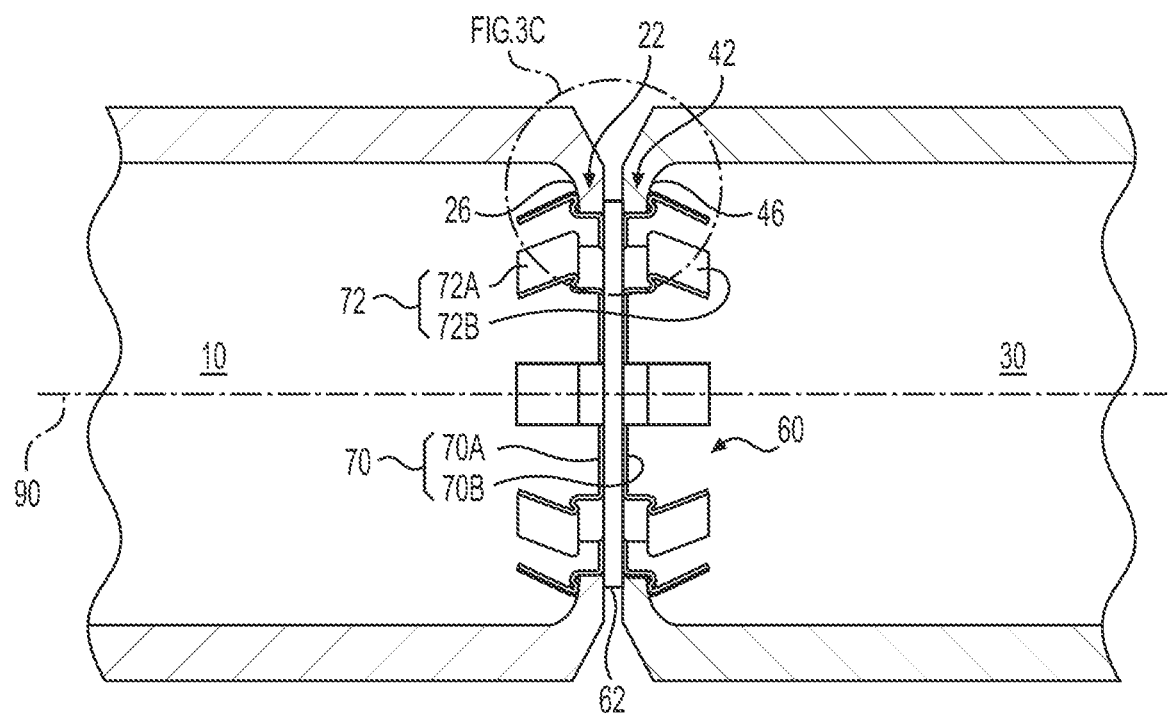
FIG. 3B is a side view showing the components that form the structure of FIG. 1 attached to the clip of FIG. 2A.
Figure 3C:
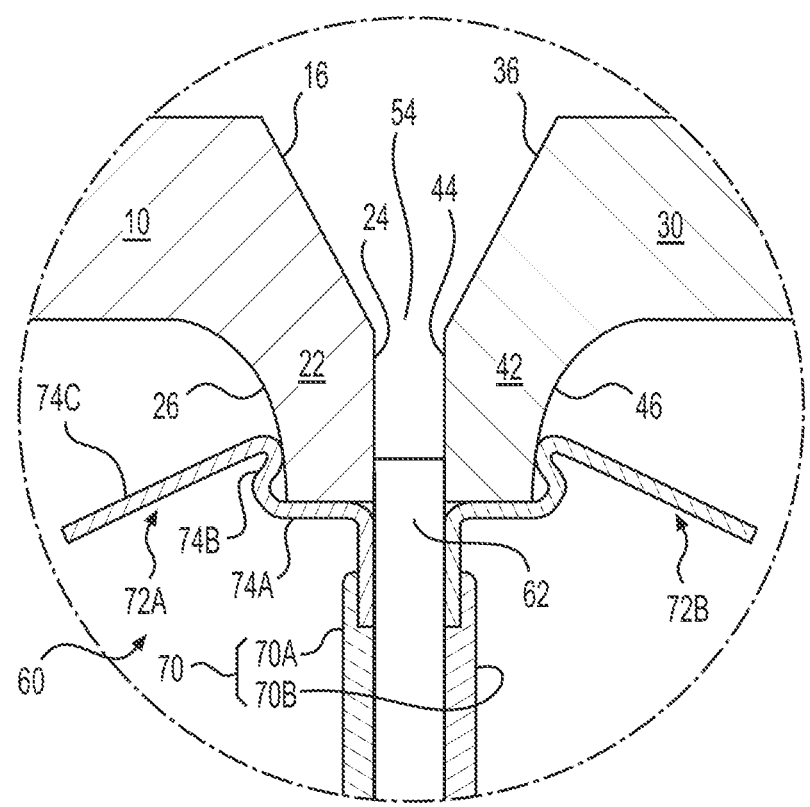
FIG. 3C is enlarged view of a portion of FIG. 3B.

When clip 60 is used to hold first and second members 10, 30 in place during welding, root protrusions 22, 42 of first and second members 10, 30 are retained in the space between each spring member 72 (e.g., second length 74B of spring member 72) and spacer 62. FIGS. 3A-3C illustrate the use of clip 60 to couple first and second members 10, 30 together, in an exemplary embodiment. FIG. 3A is an illustration before the first and second members are coupled together by clip 60, FIG. 3B is an illustration after these components are coupled together, and FIG. 3C is an enlarged view of a portion of FIG. 3B. In the discussion below, reference will be made to FIGS. 3A-3C. In some embodiments, to couple clip 60 to (for example) first member 10, the two components may be pressed together. When these components are pressed together, root protrusion 22 of first member 10 may press against, and apply a force on, spring members 72. This force may cause the spring members 72 to flex downward towards central axis 90. For example, when clip 60 is pressed against first member 10, the base of root protrusion 22 applies a force on third length 74C (of spring members 72A) and causes spring members 72A to flex downwards. When spring members 72A flex downwards, second length 74B (of spring members 72A) moves closer to central axis 90, and the diameter of clip 60 (as defined by a circle that circumscribes second length 74B of each spring member 72, see FIG. 2B) becomes smaller, allowing the root protrusion 22 to slip over second length 74B into the space between second length 74B and spacer 62. Since the outer diameter D of spacer 62 (see FIG. 2B) is greater than the inner diameter of first member 10 (as defined by the base of root protrusion 22), the root protrusion 22 does not pass over spacer 62. Instead, end surface 24 of root protrusion 22 abuts against spacer 62. When root protrusion 22 passes over second length 74B, spring members 72A flex back and retain root protrusion 22 in the space between second length 74B (of spring members 72A) and spacer 62. In this configuration, second length 74B of spring members 72A press against a back surface 26 of root protrusion 22 causing end surface 24 of root protrusion 22 to press against spacer 62. First member 10 is thus coupled to clip 60.

Second member 30 may also be similarly coupled to clip 60 and positioned such that its root protrusion 42 is positioned between spring members 72B and spacer 62. When first and second members 10, 30 are coupled to and retained by clip 60, gap 54 is formed between end surfaces 24 and 44 of root protrusions 22 and 42. The thickness t (see FIG. 2B) of spacer 62 may be configured such that a desired value of gap 54 is obtained between root protrusions 22 and 42. With the first and second members 10, 30 retained by clip 60, molten weld material 52 may be dispensed into the groove formed between first and second members 10, 30 (e.g., between end surfaces 16, 24 of first member 10 and end surfaces 36, 44 of second member 30) to form weld 50 (see FIG. 1B). As can be seen in FIG. 3C, using clip 60 to retain first and second members 10, 30 allows the molten weld material 52 to flow without any disruption into the groove. Thus, clip 60 facilitates the formation of a void-free weld 50. After formation of weld 50, clip 60 may be removed or may be left in place (e.g., if removal of clip after welding is not needed or is difficult).

It should be noted that the above described shape of clip 60, spring members 72, etc. are only exemplary. As will be recognized by people skilled in the art, clip 60 and spring members 72 may have any shape and configuration suitable to retain (temporarily or permanently) first and second members 10, 30. The dimensions of clip 60 and spring members 72 may also depend on the application. For example, the dimensions of spring members 72 (length, thickness, shape, etc.) may be selected based on the desired stiffness and retention force of the resulting spring members. Further, as explained above, the thickness t and outer diameter D of spacer 62 (see FIG. 2B) affects the dimensions of the weld (e.g., gap 54 and depth of weld in groove, etc.) formed between the components being welded. Therefore, these dimensions may be selected based on the desired size of weld 50. Similarly, in embodiments where the clip is left in place after welding, the inner diameter d of spacer 62 may be selected based on the anticipated use of structure 100. In some embodiments, spacer 62 may be modified or eliminated. For example, in embodiments end surface 24 of first member 10 abuts end surface 44 of second member 30 during welding, spacer 62 (or the portion of spacer 62 that is positioned between end surfaces 24 and 44) may be eliminated.

In some embodiments, first frame 70A (which includes multiple spring members 72A on its periphery), second frame 70B (which includes multiple spring members 72B on its periphery), and spacer 62 may be formed separately (by any suitable process), and then attached together to form clip 60. However, this is not a requirement. In some embodiments, clip 60 may be formed as a one-piece, single unitary component or part. In general, clip 60 may include any number of parts. In some embodiments, the first and second frames 70A, 70B may be formed as a single component which is then attached to (or otherwise joined to) spacer 62 to form clip 60. Clip 60 may be formed of any material (single or multiple materials) that is suitable to retain components together during welding. In some embodiments, some or all parts of clip 60 may be made of a steel. In some embodiments, some components (e.g., frame 70 that includes spring members 72) may be made of a spring steel and other components (e.g., spacer 62) may be made of a weldable steel.

Figure 4:
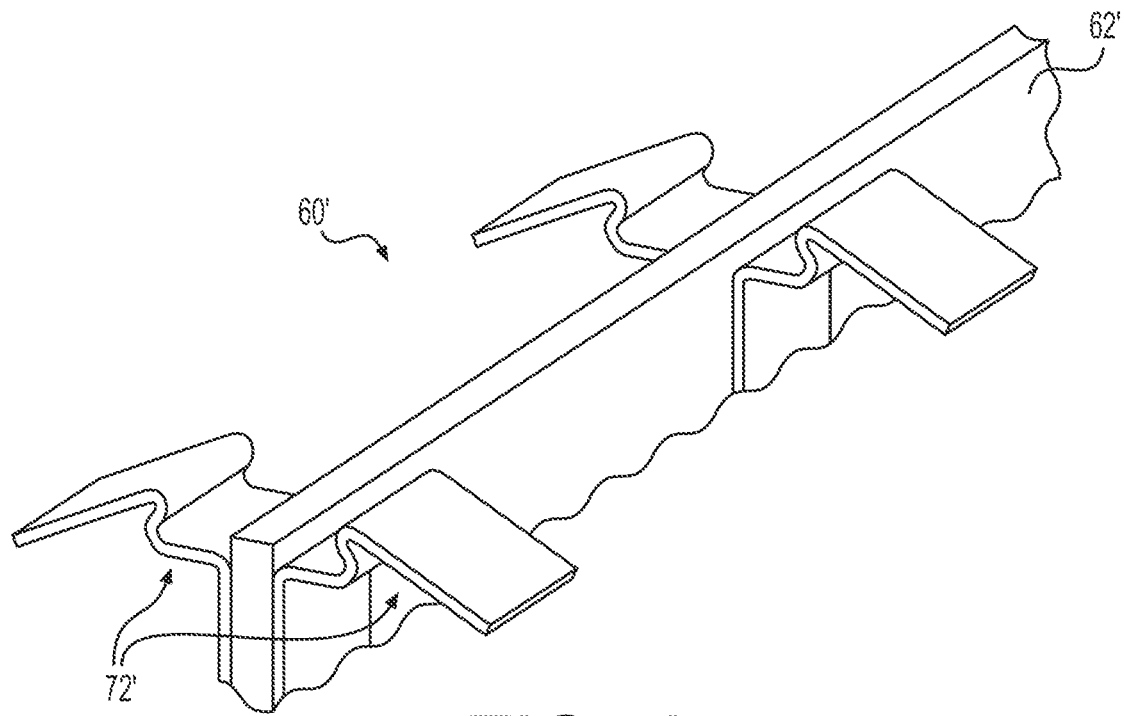
FIG. 4 is a perspective view of another exemplary clip of the current disclosure.

As explained previously, the shape and configuration of the clip used to retain components during welding depend on the shape of the welded components. For example, when first and second members 10, 30 are tubular components (see FIG. 3A), a clip that extends along a circular axis (or a circular clip 60) is used. When the welded components have a different configuration, the clip may also have a different configuration. For example, when first and second members 10, 30 are in the form of planar elements or plates, a clip that extends along a linear axis (or a linear clip) may be used. And, when first and second components 10, 30 are components that are curved along an arc or a curve, a clip that extends along a similarly curved path may be used. FIG. 4 illustrates an exemplary clip 60' that may be used to retain first and second members 10, 30 in the form of plates (e.g., the cross-section of FIG. 1A extends along an axis that extends linearly into the paper). Clip 60' may have multiple spring members 72' attached to a linear spacer 62' (i.e. a spacer 62' that extends along a linear axis). Since spring members 72' of clip 60' is similar in structure and function to spring members 72 of clip 60, they are not described in detail herein. In some embodiments, spring members 72' may be substantially equally spaced apart on spacer 62', and in some embodiments, the spring members 72' on either side of spacer 62' may be symmetrically positioned about the spacer 62'. However, it should be noted that a symmetric positioning of spring members 72' (e.g., about spacer 62') is not a requirement. That is, in some embodiments, spring members 72' on either side of spacer 62' may not be symmetrically positioned about spacer 62'.

It should be noted that the width and spacing (dimension along the direction of spacer 62') of the spring members 72' illustrated in FIG. 4 is only exemplary. In general, the width and spacing of spring members 72' may be any value. It is also contemplated that in some embodiments, only a single spring member 72' may be provided on either side of spacer 62' (e.g., a single spring member 72' that spans over substantially the entire length of spacer 62'). Spring members 72' of clip 60' may engage with and retain root protrusions 22 and 42 of first and second members 10, 30 (see FIG. 3C) in a manner similar to spring members 72 of previously described clip 60. In some embodiments, multiple individual spring members 72' may be attached to spacer 62' to form clip 60'. In some embodiments, the spring members 72' on one side of spacer 62' may be part of (or may be attached to) a frame that is attached to spacer 62', and the spring members 72' on the other side of spacer 62' may be part of a frame that is attached to spacer 62'. That is, clip 60' may include multiple parts that are joined together. However, as described with reference to clip 60, this is only exemplary, and in some embodiments, clip 60' may be formed as a single part.

INDUSTRIAL APPLICABILITY

The disclosed retention clip may be used to retain workpieces having any suitable geometry during welding (or other suitable forms of joining). In an exemplary embodiment, the retention clip is used to hold in place two workpieces having root protrusions during welding. An exemplary method of using the retention clip will now be described.

Figure 5:
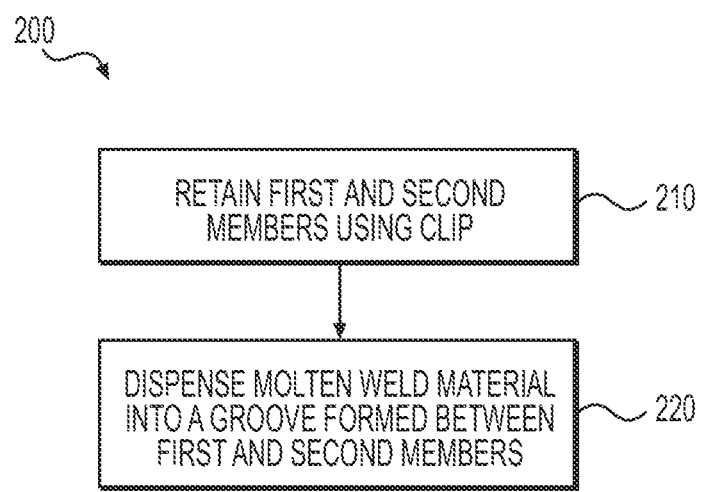
FIG. 5 is a flow chart showing an exemplary method of using a clip to retain components for welding.

FIG. 5 is a flow chart that illustrates an exemplary method 200 of using clip 60 to hold in place first and second members 10, 30 (of FIGS. 3A-3C) while forming weld 50. Clip 60 may first be attached to first and second members 10, 30 such that root protrusions 22 and 42 are positioned between spring members 72 and spacer 62 (see FIG. 3C) (step 210). In this configuration, a grove is formed between first and second members 10, 30. The grove includes a gap 54 between end surfaces 24 and 44 (of root protrusions 22 and 42) formed by a portion of spacer 62 (of clip 60) positioned between these end surfaces. Clip 60 may be attached to first and second members 10, 30 in any order. For example, in some embodiments, the spring members 72 on one side of clip 60 may first be attached to root protrusion 22 of first member 10 and the root protrusion 42 of second member 30 may then be attached to the spring members 72 on the opposite side of clip 60. In some embodiments, the first and second members 10, 30 may be attached to spring members 72 on either side of clip 60 at substantially the same time. With the first and second members 10, 30 held in place by clip 60, molten weld material 52 may be dispensed into the groove formed between first and second members 10, 30 (step 220). The molten weld material may flow into and fill the groove including gap 54. Weld 50 may be formed after solidification of the molten weld material 52. After formation of weld 50, clip 60 may be removed or left in place. Since clip 60 holds first and second members 10, 30 using their root protrusions 22, 42, there are no features in the grove that may block or disrupt the flow of the molten weld material in the groove. Therefore, the molten weld material 52 may flow into all regions of the groove and to facilitate a void-free weld 50 may be formed.

It will be apparent to those skilled in the art that various modifications and variations can be made to the disclosed retention clip. Other embodiments of the clip will be apparent to those skilled in the art from consideration of the specification and practice of the clip disclosed herein. It is intended that the specification and examples be considered as exemplary only, with a true scope of the invention being indicated by the following claims and their equivalents.

What is claimed is:

1. A retention clip used to retain workpieces during welding, comprising:
    a spacer that extends along an axis;
    a plurality of first spring members spaced apart from each other along the axis and positioned on one side of the spacer, wherein the plurality of first spring members are configured to bias a portion of a first workpiece towards the spacer; and
    a plurality of second spring members spaced apart from each other along the axis and positioned on an opposite side of the spacer, wherein the plurality of second spring members are configured to bias a portion of a second workpiece towards the spacer.

2. The clip of claim 1, wherein the axis is a circular axis.

3. The clip of claim 2, wherein the plurality of first spring members and the plurality of second spring members are arranged symmetrically about a central axis, wherein the circular axis extends about the central axis.

4. The clip of claim 1, wherein the axis is a linear axis.

5. The clip of claim 4, wherein a spacing between adjacent first spring members of the plurality of first spring members is substantially the same, and a spacing between adjacent second spring members of the plurality of second spring members is substantially the same.

6. The clip of claim 1, wherein the plurality of first spring members and the plurality of second spring members are arranged symmetrically about the spacer.

7. The clip of claim 1, wherein the plurality of first spring members is part of a first frame attached to the spacer.

8. The clip of claim 7, wherein the plurality of second spring members is part of a second frame attached to the spacer.

9. The clip of claim 1, wherein the plurality of first spring members and the plurality of second spring members include spring steel.

10. The clip of claim 1, wherein each spring member of the plurality of first spring members and the plurality of second spring members include a (a) first length and a third length that are spaced apart from each other in a direction normal to the axis and extends in a direction away from the spacer, and (b) a second length that extends between the first length and the third length.

11. A retention clip used to retain workpieces during welding, comprising:
    a spacer that extends along an axis;
    a plurality of first spring members positioned on one side of the spacer, wherein each spring member of the plurality of first spring members is shaped to contact a portion of a first workpiece and bias the first workpiece towards the spacer; and
    a plurality of second spring members positioned symmetric to the plurality of first spring members on an opposite side of the spacer, wherein each spring member of the plurality of second spring members is shaped to contact a portion of a second workpiece and bias the second workpiece towards the spacer.

12. The clip of claim 11, wherein the clip is configured to retain the first and second workpiece such that a groove is formed between the first and second workpieces.

13. The clip of claim 11, wherein each spring member of the plurality of first spring members and the plurality of second spring members include a (a) first length and a third length that are spaced apart from each other in a direction normal to the axis and extends in a direction away from the spacer, and (b) a second length that extends between the first length and the third length.

14. The clip of claim 11, wherein the axis is one of a circular axis or a linear axis.

15. The clip of claim 11, wherein the plurality of first spring members and the plurality of second spring members include spring steel.

16. The clip of claim 11, wherein the plurality of first spring members is part of a first frame attached to the spacer, and the plurality of second spring members is part of a second frame attached to the spacer.

17. The clip of claim 1, wherein the spacer is configured to be positioned between the first workpiece and the second workpiece such that the first workpiece contacts a first side of the spacer and the second workpiece contacts a second side of the spacer, wherein the first side and the second side are opposite sides of the spacer.

18. The clip of claim 17, wherein the plurality of first spring members are configured to press the portion of the first workpiece against the first side of the spacer and the plurality of second spring members are configured to press the portion of the second workpiece against the second side of the spacer.

19. The clip of claim 11, wherein the spacer is configured to be positioned between the first workpiece and the second workpiece such that the first workpiece contacts a first side of the spacer and the second workpiece contacts a second side of the spacer, wherein the first side and the second side are opposite sides of the spacer.

20. The clip of claim 19, wherein the plurality of first spring members are configured to press the portion of the first workpiece against the first side of the spacer and the plurality of second spring members are configured to press the portion of the second workpiece against the second side of the spacer.

* * * * *